United States Patent [19]

Okada

[11] Patent Number: 5,528,945
[45] Date of Patent: Jun. 25, 1996

[54] ENGINE STARTER

[75] Inventor: Michio Okada, Gumma-ken, Japan

[73] Assignee: Mitsuba Electric Mfg. Co., Ltd., Gumma-ken, Japan

[21] Appl. No.: 251,825

[22] Filed: May 31, 1994

[30] Foreign Application Priority Data

Jun. 23, 1993 [JP] Japan ............................. 5-177303

[51] Int. Cl.⁶ ..................................................... F02N 15/06
[52] U.S. Cl. .................................. 74/7 A; 74/7 E; 74/7 C
[58] Field of Search ............................. 74/7 A, 7 E, 7 C, 74/443

[56] References Cited

U.S. PATENT DOCUMENTS

| | | | |
|---|---|---|---|
| 3,199,364 | 8/1965 | Dew | 74/443 X |
| 4,440,033 | 4/1984 | Kurihara et al. | 74/7 E X |
| 4,779,470 | 10/1988 | Morita et al. | 74/7 A X |
| 5,353,658 | 10/1994 | Nagashima et al. | 74/7 A |

FOREIGN PATENT DOCUMENTS 3-41169  4/1991  Japan.

*Primary Examiner*—Allan D. Herrmann
*Attorney, Agent, or Firm*—Skjerven, Morrill, MacPherson, Franklin & Friel; Thomas S. MacDonald

[57] ABSTRACT

In an engine starter comprising a one-way clutch provided around a pinion support shaft carrying a pinion in a torque transmitting relationship but in an axially slidable manner, and an annular input gear to transmit torque to a clutch outer member of the one-way clutch, to prevent an eccentricity of the clutch outer member from seriously affecting the coupling structure between the motor and the input gear, the outer circumferential surface of the clutch outer member is provided with an external teeth serration while the input gear 12 is provided with an internal teeth serration so as to form a serration coupling. The serration coupling is provided with a sufficient radially play to accommodate a maximum eccentricity of the clutch outer member. Thus, the engine starter can be made reliable in use without requiring any undue precision during the fabrication process.

9 Claims, 2 Drawing Sheets

1

ENGINE STARTER

TECHNICAL FIELD

The present invention relates to an engine starter, and in particular to an engine starter provided with a one-way clutch interposed between a torque transmitting member such as an input gear and a pinion which is adapted to be selectively engaged with a ring gear of an engine.

BACKGROUND OF THE INVENTION

Conventionally, in an automotive engine starter, the torque of a motor is transmitted to a pinion via a one-way clutch, for instance, of a roller clutch type, and the pinion is in turn selectively meshed with a ting gear of an engine as disclosed, for instance, in Japanese utility model laid-open publication (kokai) No. 3-41169.

According to such an engine starter, the clutch outer member of the one-way clutch surrounds the base end of the pinion support shaft which forms the clutch inner member, and the clutch outer member is integrally coupled with a torque transmitting member which is in turn coupled with an output shaft of a motor via gears. The radially central part of the torque transmitting member is provided with means for coupling with the clutch outer member while its outer circumferential surface is provided with external teeth to be coupled with the output shaft of the motor via gears.

According to such a one-way clutch, the clutch outer member inevitably involves a small eccentricity during its operation or due to a fabrication error which could affect the gear coupling with the motor output shaft, and if the eccentricity is excessive, it could not only produce noises from the gears but also could damage the gear coupling structure. Therefore, it has been necessary to machine and assemble the various component parts with a sufficient precision so that the bearings for the clutch outer member may be free from any such eccentricity as much as possible, and/or to design the gear coupling portion to have a sufficient durability. In either case, the fabrication cost and the amount of necessary work increase, and the size of the engine starter has to be increased.

BRIEF SUMMARY OF THE INVENTION

In view of such problems of the prior art, a primary object of the present invention is to provide an improved engine starter in which an eccentricity of the clutch outer member would not seriously affect the coupling structure between the motor and the torque transmitting member.

A second object of the present invention is to provide an engine starter which is easy and economical to fabricate.

A third object of the present invention is to provide an engine starter which is durable in use.

According to the present invention, these and other objects can be accomplished by providing a engine starter, comprising: an main casing; an electric motor mounted on the main casing; a pinion support shaft rotatably mounted on the main casing; a pinion carried by the pinion support shaft in a torque transmitting relationship; shift means for actuating the electric motor and shifting the pinion to a position suitable for meshing with a ring gear of an engine that is to be started; an annular torque transmitting member coaxially surrounding the pinion support shaft, and connected to an output shaft of the motor in a torque transmitting relationship; an annular one-way clutch coaxially surrounding the pinion support shaft to transmit torque from the torque transmitting member to the pinion support shaft, and having a clutch outer member serving as an input member thereof; and coupling means interposed between the torque transmitting member to the clutch outer member in a torque transmitting relationship, the coupling means being provided with a radial play for accommodating an eccentricity of the clutch outer member.

Thus, even when there is a slight eccentricity in the clutch outer member, it can be accommodated by the radial play provided in the coupling means, and the coupling structure between the torque transmitting member and the motor output shaft would not be seriously affected by the eccentricity of the one-way clutch.

According to a preferred embodiment of the present invention, the torque transmitting member is rotatably supported by the pinion support shaft so that the torque transmitting member may be compactly installed in the engine starter assembly for transmitting torque from the electric motor to the one-way clutch. The torque transmitting member is further provided with an annular axial projection provided with an internal teeth serration on its inner circumferential surface which meshes with a cooperating external teeth serration provided around an outer circumferential surface of the clutch outer member. Thus, a necessary radially play can be easily obtained by properly designing the serration coupling. Furthermore, since the serration coupling allows the torque transmitting member and the clutch outer member to be joined from the axial direction, the assembly work is simplified.

Typically, the torque transmitting member is provided with an external teeth gear which meshes with a pinion mounted on an output shaft of the motor. In this case, if the external teeth gear is made of a plastic member, it is possible to reduce the noise from the gear coupling between the motor output shaft and the torque transmitting member. Furthermore, the plastic gear is more capable of accommodating any eccentricity in the gears, and thus provides an additional advantage of accommodating any dimensional errors in the gears.

The one-way clutch may comprise at least one recess defined between an inner circumferential surface of the clutch outer member and an outer circumferential surface of the pinion support shaft and having a certain circumferential length and a radial width which diminishes along a circumferential direction, a roller received in each recess, and a spring member urging the roller in the direction for diminishing the radial width of the recess. According to such a one-way clutch, a certain amount of eccentricity of the clutch outer member is inevitable for proper operation of the one-way clutch.

According to the preferred embodiment of the present invention, the pinion is axially slidably mounted on the pinion support shaft, and the pinion support shaft consists of a hollow shaft rotatably supported by the main casing, the shift means comprising a push rod passed centrally through the pinion support shaft, and a shift fork which pushes the push rod against the pinion to project the pinion into meshing with the ring gear. Thus, the pinion support shaft rotates around its axial center line, but may remain stationary in the axial direction.

To prevent any impulsive stress to be produced when the pinion fails to mesh with the ring gear of the engine, the push rod may be provided with a spring-biased telescopic assembly which, for instance, may comprise a radial external flange provided in a rear end of a push rod main body, a sleeve member having an radial internal flange engaging the external flange at a front end thereof, a lid member closing a rear end of the sleeve member, and a compression spring interposed between the external flange and the lid member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
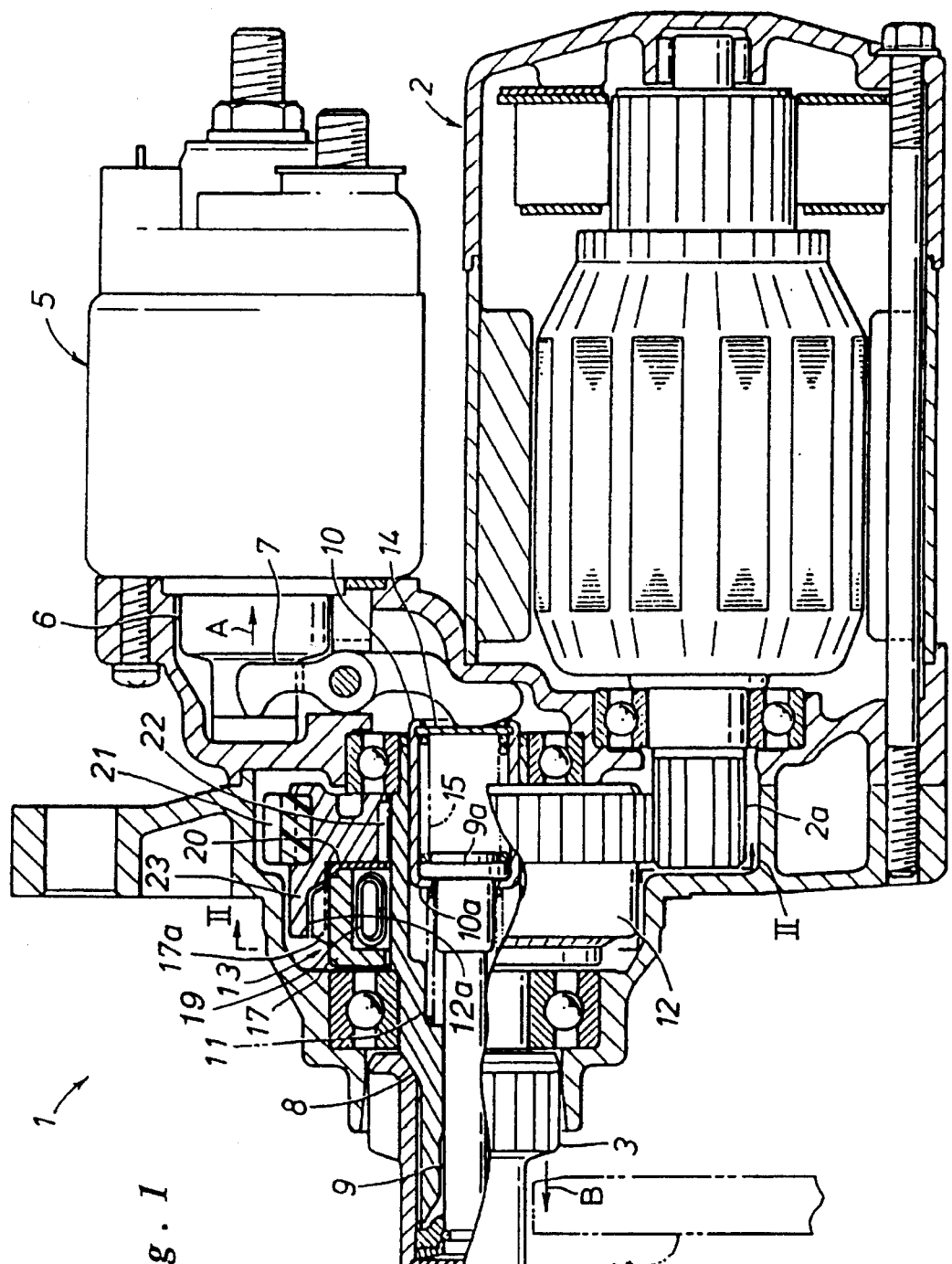
FIG. 1 is a sectional side view of an essential part of an automotive engine starter according to the present invention taken along an axial line thereof.

FIG. 1 is a sectional side view, taken along a longitudinal line, of an essential part of an automotive engine starter 1 to which the present invention is applied. This engine starter 1 drives a ring gear 4 by selectively meshing a pinion 3 rotated by a motor 2 with the ring gear 4 of the engine. By selectively actuating a magnetic switch 5 integrally provided on the starter 1, the shifting movement of the pinion 3 and the rotation of the motor 2 are controlled. As shown in the drawing, a shift lever 7 consisting of a fork member is interposed between an armature 6 of the magnetic switch 5 and the pinion 3, and synchronizes the movements of these two parts so that the pinion 3 may be selectively shifted in unison with the axial movement of the armature 6.

The pinion 3 is coaxially fitted on a pinion support shaft 8 which extends in parallel with the axial line of the motor 2, and is coupled with the pinion support shaft 8 via a spline coupling or the like which allows transmission of torque and an axial movement. This pinion support shaft 8 consists of a hollow shaft which coaxially receives a push rod 9 therein. The rear end of the push rod 9 is provided with a radial external flange 9a. A rod stopper 10 consisting of a tubular sleeve member and serving as a member for transmitting a shifting force is coaxially coupled with the rear end of the push rod 9 in an axially slidable manner.

The associated axial end of the rod stopper 10 is provided with a radial internal flange 10a adapted to engage an axial end of the external flange 9a facing the pinion 3, and a return spring 11 consisting of a compression coil spring is interposed between an internal shoulder surface of the pinion support shaft 8 and the internal flange 10a to urge the push rod 9 in the direction to retract the pinion 3.

The rear end of the rod stopper 10 adjacent to the shift lever 7 is crimped upon the outer periphery of a rod cover 14 consisting of a disk member to fixedly secure the rod cover 14 at a position to close the open rear end of the rod stopper 10. A spring-biased telescopic assembly includes a shift spring 15 consisting of a compression coil spring with a certain pre-stress is coaxially received in the rod stopper 10 between the external flange 9a and the rod cover 14. Thus, in the illustrated initial condition, the external flange 9a and the internal flange 10a are retained in a mutually abutting condition under the spring forces of the return spring 11 and the shift spring 15.

When the magnetic switch 5 is deenergized, the armature 6 is in a projected state under the spring force of a return spring not shown in the drawings, and the shift lever 7 having its one end engaged in a slot provided in an external end of the armature 6 abuts the external face of the rod cover 14 at its other end. An annular torque transmitting member 12 is fitted on an outer circumferential surface of the pinion support shaft 8 via a bearing metal or, alternatively, a needle bearing 22 in a freely rotatable manner, and an input gear 21 made of synthetic resin is integrally fitted on this annular torque transmitting member 12 which may be made of steel with suitable means (for instance by insert molding), and this input gear 21 meshes with a pinion or a drive gear 2a fitted on the drive shaft of the motor 2 in a coaxial relationship. A one-way clutch 13 is interposed between the torque transmitting member 12 and the pinion support shaft 8 to transmit torque from the input gear 21 to the pinion support shaft 8.

According to the engine starter 1 having the above described structure, when the coil of the magnetic switch 5 is energized, the armature 6 is displaced into the retracted position as indicated by the arrow A. As a result, the shift lever 7 rotates in clockwise direction in the drawing, and the rod stopper 10 is pushed outward against the spring force of the return spring 11 so that the push rod 9 is pushed out in the direction indicated by the arrow B along with the pinion 3 with the external flange 9a pushed against the internal flange 10a of the rod stopper 10 by the shift spring 15. At the same time, electric current is supplied by the magnetic switch 5 to the motor 2 so that the drive torque of the motor 2 is transmitted to the pinion support shaft 8 via the input gear 21, the torque transmitting member 12, and the one-way clutch 13, and the pinion 3 rotates with the pinion support shaft 8.

Figure 2:
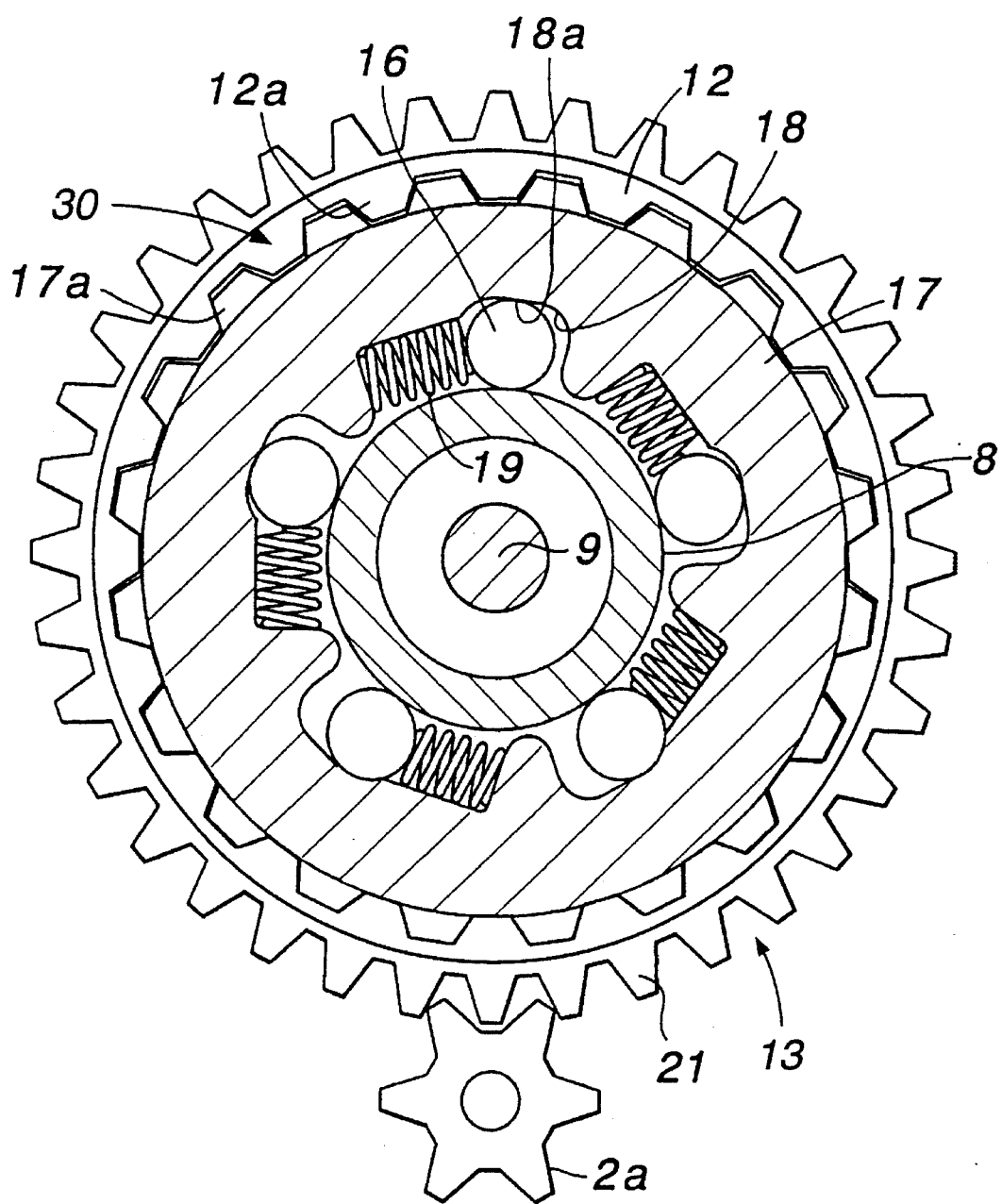
FIG. 2 is an enlarged cross sectional view of an essential part of FIG. 1 taken along line II—II of FIG. 1.

Referring to FIG. 2, the one-way clutch 13 comprises five rollers 16 arranged around the outer circumferential surface of the pinion support shaft 8 in a rolling contact and at equal intervals, and a clutch outer member 17 confining the rollers 16. Each of the rollers 16 is received in a recess 18 provided in the clutch outer member 17 so as to permit a certain amount of circumferential displacement. The outer circumferential surface of the pinion support shaft 8 and an opposing bottom surface 18a of each of the recesses 18 are disposed in such a manner that the gap between them gradually gets narrower in the circumferential direction, and the corresponding roller 18 is urged by a compression coil spring 19 in the narrowing direction. An end surface of the clutch outer member 17 is integrally provided with a clutch cover 20 for retaining the rollers 16 and the compression coil springs 18 in position. The roller clutch type one-way clutch is provided with the above described structure.

Coupling means 30 comprises a serration coupling having an external teeth serration 17a formed around the outer circumferential surface of the clutch outer member 17 which meshes with an internal teeth serration 12a provided in the inner circumferential surface of an annular projection 23 projecting axially from the torque transmitting member 12 in a torque transmitting relationship. By thus providing the clutch outer member 17 separately from the torque transmitting member 12 or the input gear 21, it is possible to form the input gear 21 from synthetic resin, and to reduce noises from the meshing of the input gear 21 with the drive gear 2a of the motor 2. If desired, the internal teeth serration 12a of the torque transmitting member 12 may also be made from synthetic resin, and to reduce noises from the meshing of the serrations.

In this one-way clutch having the above described structure, the relative positions of the rollers 16 along the circumference of the pinion support shaft 8 may be such that the eccentricity of the clutch outer member 17 may be maximized as illustrated in FIG. 2. Even in such a case, according to the one-way clutch of the present invention, the clutch outer member 17 and the torque transmitting member 12 are coupled with a serration coupling, and the radial play between the external teeth and the internal teeth of this serration coupling is selected to be equal to or greater than the maximum eccentricity of the clutch outer member 17. Furthermore, a gap 17b between the pinion support shaft 8 and the inner circumferential surface of an end wall of the clutch outer member 17 and/or the inner circumferential surface of the clutch cover 20 is selected to be comparable to the mentioned radial play to avoid any possibility of interference.

Therefore, even when the eccentricity is maximized, it can be accommodated by the play in the serration. It is not necessary to install the clutch outer member 17 on the pinion support shaft 8 at high precision, for instance, by using a metal bearing, but may provide a gap 17b between them as illustrated in FIG. 1. Thus, the assembling of the clutch outer member is simplified, and the amount of work required for assembling the one-way clutch can be reduced.

According to the present invention, because the torque transmitting member adapted to be driven by a motor and the clutch outer member are joined with each other by way of a meshing engagement between internal teeth and external teeth serrations, and the radial play between the internal teeth and the external teeth is such as to accommodate the maximum eccentricity of the clutch outer member, the need for precisely centering the clutch outer member is eliminated with any eccentricity in the clutch outer member accommodated by the radial play between the internal teeth and the external teeth. The present invention can thus provide a substantial advantage in improving the durability of the engine starter, simplifying the assembly work and reducing the fabrication cost.

Although the present invention has been described in terms of a specific embodiment, it is possible to modify and alter details thereof without departing from the spirit of the present invention. For instance, the present invention may also be applied to an engine starter which employs a planetary gear assembly for transmitting torque from the motor to the one-way clutch.

What we claim is:

1. An engine starter, comprising:

a main casing;

an electronic motor mounted on said main casing;

a pinion support shaft rotatably mounted on said main casing;

a pinion carried by said pinion support shaft in a torque transmitting relationship;

shift means for actuating said electric motor and shifting said pinion to a position suitable for meshing with a ring gear of an engine that is to be started;

an annular torque transmitting member coaxially surrounding said pinion support shaft, and connected to an output shaft of said motor in a torque transmitting relationship;

an annular one-way clutch coaxially surrounding said pinion support shaft to transmit torque from said torque transmitting member to said pinion support shaft, and having a clutch outer member serving as an input member thereof; and coupling means interposed between said torque transmitting member and said clutch outer member for transmitting torque;

said coupling means being provided with a radial play for accommodating an eccentricity of said clutch outer member.

2. An engine starter according to claim 1, wherein said torque transmitting member is rotatably supported by said pinion support shaft.

3. An engine starter according to claim 2, wherein said pinion is axially slidably mounted on said pinion support shaft, and said pinion support shaft consists of a hollow shaft rotatably supported by said main casing, said shift means comprising a push rod passed centrally through said pinion support shaft, and a shift lever which pushes said push rod against said pinion to project said pinion into meshing with said ring gear.

4. An engine starter according to claim 3, wherein said push rod is provided with a spring-biased telescopic assembly.

5. An engine starter according to claim 4, wherein said spring-biased telescopic assembly comprises a radial external flange provided in a rear end of a push rod main body, a sleeve member having an radial internal flange engaging said external flange at a front end thereof, a rod cover closing a rear end of said sleeve member, and a compression spring interposed between said external flange and said rod cover.

6. An engine starter according to claim 2, wherein said torque transmitting member comprises an annular member rotatably supported by said pinion support shaft, and provided with an annular axial projection provided with an internal teeth serration on its inner circumferential surface which meshes with a cooperating external teeth serration provided around an outer circumferential surface of said clutch outer member.

7. An engine starter according to claim 2, wherein said torque transmitting member is provided with an external teeth gear which meshes with a pinion mounted on an output shaft of said motor.

8. An engine starter according to claim 7, wherein said external teeth gear is made of a plastic member.

9. An engine starter according to claim 1, wherein said one-way clutch comprise at least one recess defined between an inner circumferential surface of said clutch outer member and an outer circumferential surface of said pinion support shaft and having a certain circumferential length and a radial width which diminishes along a circumferential direction, a roller received in each recess, and a spring member urging said roller in said direction for diminishing said radial width of said recess.

* * * * *